United States Patent

Fujita

[11] Patent Number: 6,143,408
[45] Date of Patent: Nov. 7, 2000

[54] WHITE LAMINATED POLYESTER FILM AND IMAGING MEDIUM

[75] Inventor: Masato Fujita, Shiga-ken, Japan

[73] Assignee: Mitsubishi Polyester Film Corporation, Tokyo, Japan

[21] Appl. No.: 09/176,349

[22] Filed: Oct. 21, 1998

[30] Foreign Application Priority Data

Oct. 24, 1997 [JP] Japan ..................................... 9-291877
Oct. 24, 1997 [JP] Japan ..................................... 9-291878

[51] Int. Cl.$^7$ .............................. B32B 27/36; B32B 7/12; C08J 7/04
[52] U.S. Cl. ..................... 428/355 R; 428/195; 428/220; 428/343; 428/480; 428/483
[58] Field of Search ................................. 428/355 R, 343, 428/480, 483, 195, 220, 522, 908; 347/105

[56] References Cited

U.S. PATENT DOCUMENTS

| | | | |
|---|---|---|---|
| 4,704,325 | 11/1987 | Crocker | 428/323 |
| 4,824,725 | 4/1989 | Thoese | 428/336 |
| 5,480,702 | 1/1996 | Matsumoto et al. | 428/328 X |

FOREIGN PATENT DOCUMENTS

| | | |
|---|---|---|
| 0 779 326 A1 | 6/1997 | European Pat. Off. . |
| 0 835 752 A2 | 4/1998 | European Pat. Off. . |
| 0 884 348 A2 | 12/1998 | European Pat. Off. . |

OTHER PUBLICATIONS

Derwent Publication No. XP–002113376, Aug. 1997.
Derwent Publication No. XP–002113377, Aug. 1996.
Derwent Publication No. XP–002113378, Mar. 1993.
Derwent Publication No. XP–002113379, Apr. 1998.

*Primary Examiner*—Daniel Zirker
*Attorney, Agent, or Firm*—David G. Conlin; Lisa Swiszcz Hazzard; Dike, Bronstein, Roberts & Cushman, LLP

[57] ABSTRACT

The present invention relates to a white laminated polyester film comprising:

a polyester base film having a transmission density of not less than 0.2 and hue b value of the surface thereof of not more than 2; and an adhesive layer laminated on at least one side of the polyester base film, which adhesive layer is formed by applying a coating solution comprising a polyvinyl alcohol resin and a water-soluble resin, a water-dispersible resin or a mixture thereof.

10 Claims, No Drawings

WHITE LAMINATED POLYESTER FILM AND IMAGING MEDIUM

BACKGROUND OF THE INVENTION

The present invention relates to a white laminated polyester film and a imaging medium (recording medium or printing medium), and more particularly, relates to a white laminated polyester film having excellent surface glossiness and a imaging medium using the same.

Recently, an ink jet printing system is rapidly applied to various types of facsimiles, printers and plotters because of many advantages of this printing system over the conventional art, such as low noise, capability of high-speed imaging, easy adaptability to full color printing and low cost.

On the other hand, by enhancement of printing speed and prevalence of full color printing requires further improvement in quality of the imaging sheets (recording sheets or printing sheets) and many studies on the imaging sheets have been made. For instance, the requirements for the hue b value and surface gloss of the imaging sheet have varied from the conventional standards for increasing clearness of the printed images, and similar review is being made on use of synthetic paper or plastic film as imaging sheet.

The plastic film used as imaging sheet is usually a white film containing a white pigment.

However, with such white films containing a white pigment, although it is possible to control the hue b value in a satisfactory way when the film is composed of a single layer, there are limitations on the improvement of surface gloss that can be attained by use of white pigments, thereby making it difficult to obtain a desired high-gloss film.

The imaging layer (recording layer or printing layer) of the imaging sheet applicable to the ink jet printing system is usually formed by applying on the base film a coating solution mainly composed of polyvinyl alcohol which is a water-soluble resin.

Incidentally, the binder resin of the imaging layer is mainly composed of a water-soluble resin, however, is unsatisfactory in its adhesiveness to the base polyester film, and it is hardly possible to obtain satisfactory adhesion between the imaging layer and polyester film even if a known easy-adhering resin layer is provided therebetween.

As a result of the present inventor's earnest studies to solve the above problems, it has been found that by laminating a layer of a different polyester on at least one side of the white polyester film, and further forming thereon an easy-adhering layer and a imaging layer, the thus obtained white polyester film is free of the above problems. The present invention has been attained on the basis of the above finding.

SUMMARY OF THE INVENTION

An object of the present invention is to provide a imaging medium which is capable of increasing clearness of the printed image, especially when a color image is formed on a white film.

Another object of the present invention is to provide a white polyester imaging medium having remarkably high adhesion between the base white polyester film and the imaging layer thereon.

To attain the above aim, in a first aspect of the present invention, there is provided a white laminated polyester film comprising:

a polyester base film having a transmission density of not less than 0.2 and a hue b value of the surface thereof of not more than 2; and an adhesive layer laminated on at least one side of the polyester base film, which adhesive layer is formed by applying a coating solution comprising a polyvinyl alcohol resin and a water-soluble resin, a water-dispersible resin or a mixture thereof.

In a second aspect of the present invention, there is provided a imaging medium comprising as a substrate the white laminated polyester film as defined in the above first aspect.

DETAILED DESCRIPTION OF THE INVENTION

The present invention is described in detail below.

This laminated white film comprises a polyester base film and an adhesive layer.

The polyesters usable for forming the polyester base film according to the present invention include, for example, polyethylene terephthalate (PET) of which not less than 80 mol % of the structural units is constituted by ethylene terephthalate; polyethylene-2,6-naphthalate (PEN) of which not less than 80 mol % of the structural units is constituted by ethylene-2,6-naphthalate; poly-1,4-cyclohexanedimethylene terephthalate (PCT) of which not less than 80 mol % of the structural units is constituted by 1,4-cyclohexanedimethylene terephthalate; polyethylene isophthalate; and polybutylene terephthalate.

As the other copolymerization components than the said principal component materials, there can be used diols such as diethylene glycol, propylene glycol, neopentyl glycol, 1,4-cyclohexanedimethanol, trimethylene glycol, tetramethylene glycol, hexamethylene glycol, triethylene glycol, polyethylene glycol, polytetramethylene glycol and polyalkylene glycol, and ester-forming derivatives such as isophthalic acid, 2,7-naphthalenedicarboxylic acid, 5-sodium sulfoisophthalate, oxalic acid, malonic acid, succinic acid, adipic acid, azelaicacid, sebacic acid, phthalic acid, diphenyl ether dicarboxylic acid and oxymonocarboxylic acid.

The polyesters used in the present invention may be either the said single polymers or copolymers or the blends thereof with small amount of other resins.

In the present invention, the polyester base film can be produced by, for instance, the following methods: (1) a method for drawing a composition comprising a polyester and a white pigment (2) a method for drawing a composition comprising a polyester and a void-forming agent.

In the method (1), as the white pigment, there can be used, for example, titanium oxide, barium sulfate, magnesium oxide, calcium carbonate and the like. The average particle size of the white pigment is usually 0.05 to 0.5 μm, preferably 0.1 to 0.4 μm. When the average particle size of the pigment is less than 0.05 μm or exceeds 0.5 μm, the produced film may be found too low in transmission density (OD), and the imaging sheet produced therewith tends to have unsatisfactory light transmission preventive performance. The amount of the white pigment added is usually 0.5 to 20% by weight, preferably 1 to 17% by weight. When its amount added is less than 0.5% by weight, the film is low in transmission density, and the imaging sheet made by using such a film tends to have poor light transmission preventive effect. On the other hand, when the amount of the pigment added exceeds 20% by weight, the film is liable to break during the film forming process, or the formed film may prove too low in mechanical strength.

As the white pigment, the titanium dioxide particles having a high opacifying effect are preferably used in the present invention. The crystal form of such titanium dioxide particles may be either anatase type or rutile type, but the anatase type is preferred in terms of hue b value and weather resistance. The titanium dioxide particle surfaces may have been treated with an oxide of aluminum, silicon, lead and/or an organic compound for improving dispersibility of the particles in the polyester and their weather resistance.

In the method (2), the polymers incompatible with the polyesters, such as polyolefins and polystyrene polymers, are used as the void-forming agent. According to this method, minute air cells are formed in the film when drawn, giving a low-density white polyester film. The thus obtained white polyester film resembles paper in weight, rigidity, hand feeling, etc., unlike the ordinary polyester films of the same thickness.

The type of the polyolefin used for the said purpose is not specified, but the kind of polyolefin having a higher modulus of elasticity than the polyester in the temperature range at the above the glass transition point of the polyester is preferably used because this type of polyolefin is helpful for forming many minute air cells in the polyester film. Typical examples of such polyolefin are polyethylene and polypropylene. The melt flow index of the polyolefin used in the present invention is usually 0.2 to 120, preferably 0.5 to 50.

The polystyrene polymers usable as void-forming agent in the present invention include the polystyrene homopolymers obtained by polymerizing the styrene monomers, and the random, block or graft copolymers mainly composed of the repeating units of styrene with other monomers. More specifically, they include amorphous polystyrene, crystalline polystyrene, impact-resistant polystyrene, acrylonitrile-styrene copolymer, acrylonitrile-butadiene-styrene copolymer, and the like.

Examples of other incompatible polymers than those mentioned above include poly-3-methylbutene-1, poly-4-methylpentene-1, polyvinyl-t-butane, 1,4-trans-poly-2,3-dimethylbutadiene, polyvinylcyclohexane, polyvinyl-t-butylether, cellulose triacetate, cellulose tripropionate, polyvinylfluoride, polychlorotrifluoroethylene, and the like. Polyacrylates, polyacryls and silicone polymers are also usable as incompatible polymer.

In the composition comprising a polyester and an incompatible polymer, the content of the polyester is preferably 70 to 98% by weight and the content of the incompatible polymer is preferably 2 to 30% by weight. When the polyester content is less than 70% by weight, the produced white polyester film tends to have unsatisfactory dimensional stability. On the other hand, when the incompatible polymer content exceeds 30% by weight, there may be produced too many air cells, which adversely affect the drawing properties of the composition. When the incompatible polymer content is less than 2% by weight, formation of the air cells may be insufficient.

The apparent specific gravity of the white polyester film produced according to the method (2) mentioned above is usually not less than 0.4, preferably not less than 0.6, even more preferably not less than 0.7. When the apparent specific gravity of the polyester film is less than 0.4, the cohesive force of the film may lower, and the cohesive force in the inside of the foamed layer may become smaller than the interfacial adhesive force between the easy-adhering resin layer and the imaging layer, making this method unsuited for producing a film which features easy adhesion.

The white polyester film of the present invention may contain, beside the said polyester and incompatible polymer, other polymer(s) as a third component in an amount not exceeding 20% by weight, as far as it is not prejudicial to the object of the present invention. Also, the white film obtained according to the method (2) may contain a white pigment for increasing its transmission density as in the case of the method (1). As such a white pigment, in view of the relation between addition density and transmission density, titanium oxide is preferably used as it contributes to the improvement of transmission density with a small content. Titanium oxide may be used singly as a white pigment or in mixture with other type of white pigment.

The white polyester film according to the present invention may also contain additives such as fluorescent brightener, colorant, defoaming agent, antistatic agent, antioxidant, lubricant, anti-blocking agent, ultraviolet absorber and light screen. It may further contain microfine particles of an inorganic or organic lubricant or the like for improving slip characteristics of the film.

The materials of the said microfine particles usable in the present invention include synthetic silica, kaolin, clay, calcium carbonate, silicon oxide, calcium terephthalate, aluminum oxide, titanium oxide, calcium phosphate, lithium fluoride, crosslinked polymers, and high-melting point organic compounds which remain insoluble in melting and film forming of the polyesters. It is also possible to use the internal particles formed in the inside of the polymer in the production of the polyester with a metallic compound catalyst, such as an alkali metal compound or an alkaline earth metal compound, used in the synthesis of polyesters. Of these materials, synthetic silica is preferred. The average size of the microfine particles is usually 0.001 to 3.5 $\mu$m, and their content in the film is usually 0.002 to 0.9% by weight.

Co-extrusion, dry lamination or other methods can be used for producing a white polyester film in the laminated structure, but the co-extrusion method is preferred. The co-extrusion method comprises the steps of drying the polyester chips to be used for forming the layers of the laminate, mixing the additives necessary for the respective layers, melting and kneading them by the separate extruders, joining the melts in a ply or in the die head, and extruding the joined material in multiple layers from a die onto a casting drum (rotary cooling drum) to form a sheet.

Various types of dryer such as hopper dryer, paddle dryer and vacuum dryer can be used for drying the polyester chips. T-die method is preferred for extrusion. In casting, use of the electrostatic pinning technique is preferred.

The casting drum temperature in the co-extrusion method is preferably set at a somewhat lower level (at around 70° C. or below) than normally required. The thus obtained non-stretched sheet is stretched in both the machine direction and the transverse direction, and then heat-set. The sheet is stretched 2.0 to 6.0 times in both directions at a temperature in the range of (Tg–10)° C. to (Tg+50)° C. Heat-setting is preferably conducted in the temperature range of 150° C. to 250° C. for 1 second to 5 minutes.

Heat-setting is usually conducted in a tense fixed state of the film, but the film may be relaxed or tentered by an amount not exceeding 20% in the longitudinal and/or transverse direction during heat-setting and/or cooling after heat-setting.

The polyester base film in the present invention may have a laminated structure, and a white pigment or an incompatible polymer is contained in at least the polyester layer constituting the white layer. In case where the white polyester film has a laminated structure, each of the intermediate layers comprise other polymer than polyester, as far as the whole structure or the surface layer mainly comprises polyester.

A white polyester film of a laminated structure can be produced at low cost since such materials as white pigment, incompatible polymer and particles can be effectively used for a specific layer alone. Also, in the case of a white polyester film of a laminated structure, as it is possible to use a laminated structure constituting a white film and a transparent polyester film selected from the incompatible resin-containing white polyester film and the white pigment-containing polyester film, the produced film has both of the innate mechanical and thermal properties of polyester and the softness and flexibility of the low-density white polyester film.

The polyester base film comprise a polyester (A) layer and a polyester (B) layer. The definition of the polyester (A) layer is principally the same definition of the above described polyester base film.

The polyester (B) layer is further defined as follows in addition to the definition of the above described polyester base film.

The polyester (B) layer in the present invention is subject to no other restrictions than that it should be a layer of a polyester of the type mentioned above, and that the 60° glossiness of the surface constituted by the polyester (B) layer should not be less than 60%. Preferably, it is a polyester layer in which the overall content of the additives is 0.1 to 1,000 ppm, more preferably 0.1 to 100 ppm. A polyester layer in which the average dispersal diameter of the additives is 0.01 to 4 µm and their overall content is 0.1 to 100 ppm, is especially preferred.

The 60° surface glossiness can be made more than 60% most easily when the thickness of the polyester (B) layer is not less than 0.5 µm. It is possible to minimize the influence of the white opacifying layer in the inside on the surface layer of the film and to sufficiently elevate 60° glossiness of the film surface by making the polyester (B) layer thickness of not less than 2 µm, preferably not less than 5 µm. The upper limit of the polyester (B) layer thickness is not defined; it may be properly decided to meet the conditions for the practical use, under the restriction that the transmission density (OD) of the film in the final form of laminated film is not less than 0.2.

In case where the white laminated polyester film of the present invention is used as a imaging medium, the transmission density, hue b value and 60° surface glossiness of the film need to fall within the ranges defined below for obtaining a preferred color tone of the imaging face (recording face or printing face) and other visual impressions such as appearance.

The transmission density (OD) of the white laminated polyester film according to the present invention is not less than 2, preferably 0.2 to 3, more preferably 0.6 to 3. When the transmission density (OD) is less than 0.2, it is impossible to secure sufficient opacifying effect as a white film, and the recorded matter in the imaging layer becomes indistinct. When the transmission density is increased more than necessary, there may result reduced mechanical strength of the film.

The hue b value of the surface constituted by the polyester base film of the present invention is not more than 2, preferably in the range from –10 to 2, more preferably from –10 to 0. When the hue b value is more than 2, the film surface assumes a slightly yellowish color tone, making it difficult to attain correct regeneration of color. When the hue b value is less than –10, the film surfaces takes a slightly bluish color tone.

The "hue b value" referred to in the present invention is the b* value of the film color (ranked as L*, a* and b*) determined according to the indication method (CIE 1976 Lightness) described in JIS Z-8729.

The 60° glossiness of the surface constituted by the polyester film according to the present invention is not less than 60%, preferably not less than 80%, more preferably not less than 100%. By making the 60° surface glossiness of the polyester film not less than 60%, it is possible to make a imaging medium surface having the impression of photographic paper, and a imaging face with a sense of high quality can be obtained.

In case where the white laminated polyester film of the present invention is used as a imaging medium, a imaging layer is usually formed as a surface functional layer of the imaging medium. When this imaging layer is provided on the white laminated polyester film surface, an easy-adhering resin layer is preferably provided as an undercoat for ensuring high interlaminar adhesion.

In the present invention, adhesive layer (herein-after referred to as an easy-adhering resin layer or primer layer) is formed by applying a coating solution containing a resin comprising a polyvinylalcohol resin and water-soluble or water-dispersible binder resin on the polyester base film and drying the obtained coat.

The polyvinyl alcohol resin (herein-after referred to as PVOH resin) contained in the coating solution used for forming the easy-adhering resin layer in the present invention can be synthesized by ordinary polymerization reaction. The PVOH resin used in the present invention is free of restrictions save that it should be soluble in water. The degree of polymerization of the polyvinyl alcohol resin of the present invention is not specified, but it is usually not less than 100, preferably selected from between 300 and 40,000. When the polymerization degree is less than 100, water resistance of the easy-adhering resin layer may be unsatisfactory. The saponification degree of the polyvinyl alcohol resin is also not specified, but usually a saponified product of polyvinyl acetate having a saponification degree of not less than 70 mol %, preferably 80 to 99.9 mol %, is practically used. The PVOH resin used in the present invention may be a polyethylene copolymer or a polyvinyl alcohol derivative subjected to a modification treatment such as acetalation or butyralation treatment, as far as its main component is polyvinyl alcohol.

The "water-dispersible binder resin" refers to the resins which don't dissolve but can be dispersed in water, more specifically the resins which can be forcibly dispersed in water with the aid of a surfactant.

As the water-soluble or water-dispersible binder resin, it is preferred to use polyethers or the self-dispersing type resins having nonionic hydrophilic groups such as hydroxyl groups or ionic hydrophilic groups (preferably anionic hydrophilic groups).

The said anionic groups are introduced into the resin through copolymerization or by other means. Examples of such anionic groups usable in the present invention include those derived from, for example, sulfonic acid, carboxylic acids, phosphoric acid, and lithium, sodium, potassium, ammonium and amine salts thereof. The ratio of the anionic group to the resin solid is usually 0.05 to 8% by weight. When the ratio of the anionic group is less than 0.05% by weight, water solubility or water dispersibility of the resin tends to deteriorate. On the other hand, when the ratio of the anionic group exceeds 8% by weight, water resistance of the easy-adhering resin layer may lower, making this resin layer more liable to absorb moisture, resulting in greater probability of blocking of the white polyester films having the said easy-adhering resin layer.

As the said binder resin, at least one type of resin selected from the group consisting of water-soluble or water-dispersible polyester resins, polyurethane resins and acrylic resins is preferably used.

The said water-soluble or water-dispersible polyesters can be synthesized from an ordinary polycondensation reaction of a polyvalent carboxylic acid and a polyvalent hydroxyl compound such as shown below.

Examples of the polyvalent carboxylic acids usable for the above reaction include terephthalic acid, isophthalic acid, orthophthalic acid, phthalic acid, 4,4'-diphenyldicarboxylic acid, 2,5-naphthalenedicarboxylic acid, 2,6-naphthalenedicarboxylic acid, 1,4-cyclohexanedicarboxylic acid, 2-potassiumsulfoterephthalic acid, 5-sodiumsulfoisophthalic acid, adipic acid, azelaic acid, sebacic acid, dodecanedicarboxylic acid, glutalic acid, succinic acid, trimellitic acid, trimesic acid, trimellitic anhydride, phthalic anhydride, p-hydroxybenzoic acid, trimellitic acid monopotassium salt, and their ester forming derivatives.

Examples of the polyvalent hydroxyl compounds include ethylene glycol, 1,2-propylene glycol, 1,3-propylene glycol, 1,3-propanediol, 1,4-butanediol, 1,6-hexanediol, 2-methyl-1,5-pentanediol, neopentyl glycol, 1,4-cyclohexanedimethanol, p-xylene glycol, bisphenol A-ethylene glycol addition product, diethylene glycol, triethylene glycol, polyethylene glycol, polypropylene glycol, polytetramethylene glycol, polytetramethylene oxide glycol, dimethylolpropionic acid, glycerin, trimethylolpropane, sodium dimethylolethylsulfonate, sodium dimethylolpropionate, and potassium dimethylolpropionate.

The said polyurethanes can be synthesized from an ordinary polymerization reaction using as starting materials a polyol, a polyisocyanate, a chain extender and a crosslinking agent.

The polyols usable for the above reaction include polyethers such as polyoxyethylene glycol, polyoxypropylene glycol, polyoxypropylenetriol and polyoxytetramethylene glycol; polyesters such as polyethylene adipate, polyethylene-butylene adipate, polypropylene adipate, polyhexylene adipate and polycaprolactone; acrylic polyols; and castor oil.

The polyisocyanates usable for the said reaction include aromatic diisocyanates such as tolylene diisocyanate, phenylene diisocyanate, 4,4'-diphenylmethane diisocyanate and 1,5-naphthalene diisocyanate, and aliphatic diisocyanates such as xylene diisocyanate, hexamethylene diisocyanate, lysine diisocyanate, 4,4'-dicyclohexylmethane diisocyanate and isophorone diisocyanate.

As the chain extender or crosslinking agent, there can be used, for example, ethylene glycol, propylene glycol, butanediol, hexanediol, diethylene glycol, trimethylolpropane, glycerin, hydrazine, ethylenediamine, diethylenetriamine, 4,4'-diaminodiphenylmethane, 4,41'-diaminodicyclohexylmethane and water.

The said acrylic resins can be synthesized by means of ordinary copolymerization using, for instance, an alkyl acrylate or methacrylate (A component) and a vinyl monomer (B component) copolymerizable therewith, and having a functional group. The ratio of the component A to the total amount of the components A and B is usually 30 to 90 mol %, and the ratio of the component B is usually 10 to 70 mol %.

The vinyl monomer which has a functional group and is compolymerizable with the alkyl acrylate or methacrylate and is preferably the one having such a functional group that can impart hydrophilicity to the acrylic resin to better its water dispersibility while enhancing adhesion of the acrylic resin to the white polyester film or to the image on the imaging layer provided on an easy-adhering resin layer, and that can also better hydrophilicity of the acrylic resin in cooperation with the polyester blended in the easy-adhering resin layer.

Preferred examples of such functional groups include carboxyl groups and salts thereof, acid anhydride groups, sulfonic groups and salts thereof, amide groups or alkylolated amide groups, amino groups (including substituted amino groups) or alkylolated amino groups and salts thereof, hydroxyl groups and glycidyl groups. Carboxyl groups or salts thereof, acid anhydride groups and glycidyl groups are preferred. Two or more types of these groups may be contained in the acrylic resin.

The acrylic resins in which the copolymerization percentage of the alkyl acrylate and/or alkyl methacrylate is not less than 30 mol %, have good coatability and can provide a strong coating film and excellent anti-block properties. By regulating the content of the alkyl acrylate and/or alkyl methacrylate in the acrylic resin to be not more than 90 mol %, it is possible to enhance water solubility or dispersibility of the compound having a specific functional group with introduction of the acrylic resin and to maintain this condition stably over a long period of time. It is also possible to better adhesion of the white polyester film to the easy-adhering resin and to realize improvement of strength, water resistance and chemical resistance of the easy-adhering resin layer through reaction in this layer.

The alkyl group in the said alkyl acrylate and alkyl-methacrylate may be, for instance, methyl, n-propyl, isopropyl, n-butyl, isobutyl, 2-ethylhexyl, lauryl, stearyl or cyclohexyl.

As the said vinyl monomer, those having a functional group such as reactive functional group, self-crosslinking functional group or hydrophilic group can be used. Examples of such vinyl monomers include alkali metal salts or alkaline earth metal salts of acrylic acid, methacrylic acid, itaconic acid, maleic acid or the like, ammonium salts, and maleic anhydride.

Examples of the vinyl monomers having an amide group or a alkylolated amide group include acrylamide, methacrylamide, N-methylmethacrylamidle, methylolated acrylamide, methylolated methacrylamide, ureidovinyl ether, β-ureidoisobutylvinyl ether, and ureidoethyl acrylate.

Examples of the vinyl monomers having an amino group or a alkylolated amino group or a salt thereof include diethylaminoethylvinyl ether, 2-aminoethylvinyl ether, 3-aminopropylvinyl ether, 2-aminobutylvinyl ether, dimethylaminoethyl methacrylate, dimethylaminoethylvinyl ether, the vinyl monomers having the said amino groups methylolated, and the vinyl monomers quaternized with a halogenated alkyl, dimethylsulfuric acid, sultone or the like.

Examples of the vinyl monomers having a hydroxyl group are β-hydroxyethyl acrylate, β-hydroxyethyl methacrylate, β-hydroxypropyl acrylate, β-hydroxypropyl methacrylate, β-hydroxyvinyl ether, 5-hydroxypentylvinyl ether, hydroxyhexylvinyl ether, polyethylene glycol monoacrylate, polyethylene glycol monomethacrylate, polypropylene glycol monoacrylate, polypropylene glycol monomethacrylate.

Examples of the vinyl monomers having a glycidyl group are glycidyl acrylate and glycidyl methacrylate.

Also, the said acrylic resins may be properly blended with acrylonitrile, styrenes, butylvinyl ether, maleic acid mono- or di-alkyl ester, fumaric acid mono- or di-alkyl ester, itaconic acid mono- or di-alkyl ester, methyl vinyl ketone, vinyl chloride, vinylidene chloride, vinyl acetate, vinylpyridine, vinylpyrrolidone, vinyltrimethoxysilane or the like as copolymer component.

The said acrylic resins may contain surfactant(s) mixed therein in the production process. However, in case where a polyester resin and/or a polyurethane resin are jointly used as a binder resin, when the ratio of the acrylic resin to such a binder resin is high, the low-molecular weight surfactant contained in the acrylic resin is concentrated in the film-forming process, and consequently, it is accumulated at the interface of the particles and forced to migrate to the interface of the easy-adhering resin layer to adversely affect its mechanical strength, water resistance and adhesiveness. In such a case, it is preferred to use an acrylic resin containing no surfactant, obtained by so-called soap-free polymerization.

An acrylic resin containing no surfactant can be produced by using the methods such as disclosed in Comprehensive Technical Data on Water-Soluble Polymers and Water-Dispersible Resins," page 309, published by Keiei Kaihatsu Center, January 1981, and a lecture meeting text: An Outlook on Future from the Results of Latest Studies—New Development of Emulsions and Their Technical Problems in Future (December 1981), Industrial Technology Research Society More specifically, the method using an oligomer or a high-molecular weight surfactant instead of a low-molecular weight surfactant; the method using a polymerization initiator such as potassium persulfate or ammonium persulfate for introducing a hydrophilic group into the polymer; the method in which the monomers having a hydrophilic group are copolymerized; the method using a reactive surfactant; the method of producing a core-shell polymer by changing the textures of the inside layer and the outside layer of the disperse phase; and other relating methods can be used for producing the water-dispersible acrylic resins containing no surfactant.

As the water soluble resin or water-dispersible resin, polyglycerol glycidyls are also preferably used.

Polyglycerol glycidyl may be contained in the coating solution used for forming the easy-adhering resin layer in the present invention. The polyglycerol polyglycidyl ether used in the present invention is synthesized from, for example, polyether glycerin and epichlorohydrin. Its average molecular weight is not specified, but it is usually not more than 1,200, preferably 250 to 1,000. When the average molecular weight of this substance is more than 1,200, its water solubility lowers to such a degree that this substance may be not preferable for use in forming an aqueous coating solution. If its average molecular weight is too small, adhesiveness of the easy-adhering resin layer may lower. The glycidyl compounds usable as a component of the said substance have at least two, preferably three or more glycidyl groups, and at least one, preferably two or more hydroxyl groups in the molecule. These functional groups may undergo intermolecular or intra molecular glycidyl/hydroxyl condensation reaction by heat in the easy-adhering resin layer.

In forming the easy-adhering resin layer in the present invention, a water-soluble or water-dispersible binder resin other than those mentioned above may be jointly used, if required. For instance, an epoxy resin or an amide resin can be used as such an additional binder resin. The skeletal structure of such a resin may be substantially a composite structure formed by copolymerization. Examples of the binder resins having a composite structure include acrylic resin grafted polyesters, acrylic resin grafted polyurethanes, vinyl resin grafted polyesters, and vinyl resin grafted polyurethanes.

The easy-adhering resin layer may have a component which reacts with the reactive functional group contained in the binder resin. As such reactive component, there can be used, for instance, methylolated or alkylolated urea-based, melamine-based, guanamine-based, acrylamide-based and polyamide-based compounds, polyamines, epoxy compounds, oxazoline compounds, aziridine compounds, block isocyanate compounds, silane coupling agents, titanium coupling agents, zirco-aluminate-based coupling agents, metal chelates, organic acid anhydrides, organic peroxides, heat- or light-reactive vinyl compounds and photosensitive resins.

The said reactive component may be either a low-molecular weight compound or a high polymer having the reactive functional groups as far as at least two reactive functional groups are contained in one molecule in the binder resin. Use of this reactive component contributes to the improvement of anti-block properties, water resistance, solvent resistance and mechanical strength of the easy-adhering resin layer.

The inactive particles may be contained in the easy-adhering resin layer for improving its slip properties. As such inactive particles, it is possible to use the inorganic particles such as particles of colloidal silica, alumina, calcium carbonate, titanium oxide and the like, and the organic particles such as particles of polystyrene resins, polyacrylic resins and polyvinyl resins. The average diameter (d) of these inactive particles is selected within the range of usually L/3 to 3L, preferably L/2 to 2L, where L is the average thickness of the easy-adhering resin layer.

A coating solution containing the said binder resin as essential component and the said reactive component and hydrophilic inactive particles as optional components is used.

The coating solution used for forming an easy-adhering resin layer on at least one side of the white polyester film is usually prepared by using water as a main medium of the coating solution for reasons of safety and hygienic effect. The coating solution may contain a small quantity of an organic solvent for the purpose of bettering water dispersibility or improving the film-forming properties, as far as water is used as the main medium. It is preferable that the organic solvent is used in such an amount that is wholly dissolved in water used as the main medium.

The organic solvents usable for the above purpose include aliphatic or alicyclic alcohols such as n-butyl alcohol, n-propyl alcohol, isopropyl alcohol, ethyl alcohol and methyl alcohol; glycols such as propylene glycol, ethylene glycol and diethylene glycol; glycol derivatives such as n-butyl cellosolve, ethyl cellosolve, methyl cellosolve and propylene glycol monomethyl ether; ethers such as dioxane and tetrahydrofuran; esters such as ethyl acetate and amyl acetate; ketones such as methyl ethyl ketone and acetone; and amides such as N-methylpyrrolidone.

The method for forming the easy-adhering resin layer on the white polyester film surface is not specified in the present invention, but preferably a method is used in which a coating solution of an easy-adhering resin is applied in the polyester film producing process. Specifically, the following methods are suggested: the coating solution is applied on the surface of a non-stretched sheet and dried; the coating solution is applied on the surface of a monoaxially stretched film and dried; or the coating solution is applied on the surface of a biaxially stretched film and dried. Of these methods, the method in which the coating solution is applied on the surface of a monoaxially stretched film and dried and hardened in the heat-treatment of the film is preferred economically.

It is also possible to combine two or more of the said coating methods. For instance, the first layer of easyadhering resin is coated on the surface of a non-stretched sheet and dried, then the sheet is monoaxially stretched, and the second layer of easy-adhering resin is coated thereon and dried. In the present invention, it is preferable from the aspect of production cost to use a method in which the coating solution is applied on a monoaxially stretched film, and after dried or in a still undried state, the coated film is stretched in the direction orthogonal to the previous monoaxial stretching.

As means for applying the coating solution of an easy-adhering resin on the surface of a white polyester film, various coating devices such as reverse roll coater, gravure coater, rod coater, air doctor coater, etc., shown in Y. Harasaki: Coating Systems, 1979, Maki Shoten, can be used.

The easy-adhering resin layer may be formed either on one side alone or on both sides of the white polyester film. In case where the said resin layer is formed on one side alone, a layer different from the easy-adhering resin layer may be formed on the opposite side to afford an additional property to the support for the imaging sheet of the present invention. Before coating, the film may be subjected to a chemical treatment or a discharge treatment for improving applicability and adhesion of the coating solution to the film. Also, a discharge treatment may be conducted after formation of the easy-adhering resin layer for further improving the surface properties of the imaging sheet support.

The dry thickness of the easy-adhering resin layer is usually 0.01 to 0.5 $\mu$m, preferably 0.02 to 0.3 $\mu$m. When the easy-adhering resin layer thickness is less than 0.01 $\mu$m, the "easy adhering" properties of the resin may not be sufficiently attained, and when the layer thickness exceeds 0.5 $\mu$m, the produced film tends to show poor blocking resistance. The problem of blocking may be serious in case where an easy-adhering resin layer is formed on both sides of the film.

The easy-adhering resin layer may be formed either on one side alone or on both sides of the white polyester film. In case where it is formed on one side alone of the film, a layer different from the easy-adhering resin layer may be formed on the opposite side to impart an additional property to the support for the imaging sheet of the present invention. Before coating, the film may be subjected to a chemical or discharge treatment for improving coatability and adhesion of the coating solution to the film. It is also possible to perform a discharge treatment after forming the easy-adhering resin layer for further improving the surface characteristics of the imaging sheet support.

The imaging medium of the present invention is constituted by forming a imaging layer on the easy-adhering resin layer. The imaging layer can be formed by a conventional method. For instance, in case of an application to the ink jet printing system, the imaging layer can be formed by applying a water/alcohol mixed solvent solution containing the additives, for example, a hydrophilic binder resin such as polyvinyl alcohol resin, a crosslinking agent, colloidal silica, etc.

The imaging layer according to the present invention can be formed by a conventional method using a preferable coating device such as mentioned above. The thickness of this imaging layer may be properly selected in conformity to the image forming system employed. For instance, in the case of the ink jet printing system, the imaging layer thickness is set to be at least 1 to 50 $\mu$m for use in the known printing apparatus for allowing the aqueous ink to be absorbed quickly in the vertical direction to minimize repulsion or blotting of the aqueous ink. By further defining the imaging layer thickness to be 3 to 50 $\mu$m, preferably 5 to 30 $\mu$m, it is possible to facilitate absorption of the aqueous ink, which is an important factor for obtaining clear prints with little blotting of the ink.

The imaging medium of the present invention is constituted by forming a imaging layer mainly composed of a water-soluble resin on the easy-adhering resin layer. The water-soluble resin used for forming the imaging layer is, for instance, selected from the resins mainly composed of polyacrylic acid, polyvinyl alcohol or the like, polyvinyl alcohol being preferred. The water-soluble resin used in the present invention may have been copolymerized with other resins or subjected to a modification treatment such as acetalation or butyralation treatment, as far as it has a water-soluble resin substance as main component in the molecule. However, if such copolymerization or modification treatment goes so far that the water-soluble resin substance becomes unable to serve as main component, it becomes hardly possible for the imaging layer to maintain water holdability required for the printing operation, such as ink jet printing, and the formed image lacks clearness.

Other additives such as crosslinking agent and colloidal silica are preferably contained in the imaging layer of the present invention. Particularly, containing colloidal silica is preferable as it helps to form appropriate spaces in the imaging layer to facilitate absorption of the ink on the imaging layer surface just after printing (such as ink jet printing), thus expediting apparent drying of the imaging layer.

Imaging on the imaging layer in the present invention can be effected by a method described as information imaging system (recording system or printing system) in "Market of Printer Peripheral Materials and Chemicals", CMC (1996). The current information imaging system is roughly divided into digital imaging system and analog imaging system, which are further classified into electrophotographic system, thermosensitive system, ink jet system, electrostatic electrography, magnetography, photo-imaging system, etc. The imaging layer of the present invention can adapt itself to any of these imaging systems and is preferred for the imaging media where a water-soluble resin is used as a main component, but its use is not limited to these applications. It is possible to apply the aqueous ink by the other methods. For instance, writing with an aqueous pen is within the scope of the present invention.

According to the present invention, as described above, it is possible to obtain a white laminated polyester film with excellent opacifying properties, good hue and high glossiness, and a high-quality imaging medium capable of forming the clear images is provided by using this film.

EXAMPLES

The present invention is described in further detail by showing the examples thereof, but it should be understood that these examples are merely intended to be illustrative and not to be construed as limiting the scope of the invention in any way. The evaluation methods used in the Examples and Comparative Examples are as described below. All "parts" and "percents (%)" in the Examples and Comparative Examples are by weight unless otherwise noted.

(1) Measurement of Laminate Thickness

Laminate thickness was measured by observing the sectional photographs of the sample films using a scanning electron microscope (SEN) S4500 (mfd. by Hitachi Ltd.) Measurement was conducted at 10 points, and the average of the 10 measurements was shown here.

(2) Transmission Density (OD)

Transmitted light density (OD) through a G filter was measured using a Macbeth densitometer "TD-904". The higher the value of the transmitted light density, the higher is the opacifying power. Measurement was made at 3 points, and the average of the 3 measurements was given. Transmission density (OD) was evaluated according to the following criterion.

⊚ (excellent): OD≧1.0
○ (good): 0.6≦OD<1.0
Δ (fair): 0.2≦OD<0.6
X (poor): OD<0.2

In the present invention, ⊚, ○ and Δ are preferable.

(3) Hue b Value

Using a color analyzer (TC-1800 MK-II mfd. by Tokyo Denshoku KK), the surface of the (B) layer of the white laminated ((A) layer +(B) layer) polyester film was measured according to the method of JIS Z-8722, and the film color (L*, a*, b*) was determined according to the indication method (CIE 1976 Lightness) described in JIS Z-8729, with the b* value given here as hue b value. The higher the b* value on the +side, the stronger is the yellowish tint. Measurement was made at 3 points, and the average of the 3 measurements was given. Color evaluation was made according to the following criterion. Hereinafter, the "b* value" is indicated as "b value" for convenience' sake.

⊚ (excellent): b value<−1
○ (good): −1≦b value<0
Δ (fair) 0≦b value<2
X (poor): 2≦b value:

In the present invention, ⊚, ○ and Δ are preferable.

(4) 60° Glossiness

Light was applied to the (B) layer surface of the white laminated ((A) layer +(B) layer) polyester film, and specula glossiness was measured with the incident light having no polarization according to the method of JIS Z-8741 using a varied-angle glossimeter (VGS-1001DP mfd. by Nippon Denshoku KK). Measurement was made at 3 points, and the average of the 3 measurements was given. 60° glossiness was evaluated according to the following criterion.

⊚ (excellent): glossiness≧100
○ (good): 80≦glossiness<100
Δ (fair): 60≦glossiness<80
X (poor): 60>glossiness In the present invention, ⊚, ○ and Δ are preferable.

(5) Adhesion of Imaging Layer

Black-color printing was conducted (over the area of 12 cm×12 cm) on the imaging layer surface by an ink jet printer (BJC-600JF mfd. by Canon Corp.) and air dried (23° C., 50% RH) for about 12 hours or more. Cellotape (18 mm wide adhesive tape, produced by Nichiban Co., Ltd.) was pasted on the printed surface and peeled off quickly. The state and result of peeling was visually observed and evaluated according to the following criterion.

○ (good): Peeled less than 20%
Δ (fair): Peeled 20% to less than 80%
X (poor): Peeled 80% or more In the present invention, ○ and Δ are preferable.

The details of the adhesive resin layer and the imaging layer in Examples 1 to 8 are as described below.

<Easy-adhering resin layer>

A coating solution (a 5% water dispersion) prepared by mixing a binder resin (1) (a polyester resin mainly composed of isophthalic acid, ethylene glycol and neopentyl glycol, with a carboxylate being introduced as water-dispersing functional group), polyvinyl alcohol (2) (saponified approximately 94%), polyglycerol glycidyl ether (3) and inactive silica particles (4) (average particle size=55 nm) in a mixing ratio of (1):(2):(3):(4)=35:35:25:5 was applied on the base film and dried to form an about 0.5 μm thick easy-adhering resin layer.

<Imaging layer>

A coating solution (an 8% water/isopropanol solution) comprising a polyvinylalcohol resin whose hydroxyl groups are partially modified to acetal (S-LEC KX-1: degree of acetalation (8±3 mol %) produced by Sekisui Chemical Co., Ltd.) was applied on the easy-adhering resin layer and dried to form an about 8 μm thick imaging layer for ink jet printing.

Example 1

100 parts of dimethyl terephthalate and 60 parts of ethylene glycol were supplied as starting materials into a reactor with 0.09 part of magnesium acetate tetrahydrate as catalyst. The reaction was started at 150° C., and the temperature was gradually raised while causing evaporation of methanol till reaching 230° C. in 3 hours.

4 hours after start of the reaction, the ester exchange reaction was substantially completed. To this reaction mixture were added 0.04 part of ethyl acid phosphate and 0.04 part of antimony trioxide for 4.5-hour polycondensation reaction. The temperature was gradually elevated from 230° C. till reaching 280° C., while pressure was gradually reduced from normal pressure till finally reaching 0.3 mmHg. The reaction was terminated on the elapse of 4.5 hours after start of the reaction, and the polymer was discharged out of the reactor under nitrogen pressure. The obtained polyester had an intrinsic viscosity of 0.65.

This polymer was subjected to solid phase polymerization under the conditions of 225° C. and 0.3 mmHg to obtain a polyester (A1) having an intrinsic viscosity of 0.81. This polyester (A1) was blended with various types of additive in the ratios shown in Table 1 by a vented twin-screw extruder to obtain the polyesters (A2)–(A4).

TABLE 1

| Polyester type | Additive | Additive content | Particle size (μm) |
| --- | --- | --- | --- |
| A1 | None | — | — |
| A2 | Titanium dioxide | 40% | 0.3 |
| A3 | Amorphous silica | 3% | 3.5 |
| A4 | Amorphous silica | 1% | 2.4 |
| A5 | Fluorescent brightener (OB-1)* | 1% | — |

*OB-1: trade name (produced by Eastman Kodak Co.)

These polyesters A1–A4 were uniformly blended in the ratios shown in Table 2 to obtain the starting polyester materials.

TABLE 2

| Starting polyester material | Polyester type | | | | |
|---|---|---|---|---|---|
| | A1 | A2 | A3 | A4 | A5 |
| W1 | 50 | 30 | 16 | — | 4 |
| W2 | 66 | 30 | — | — | 4 |
| T1 | 99 | — | — | 1 | — |

Polyester material W1 for forming the polyester (A) layer and polyester material T1 for forming the polyester (B) layer were dried at 180° C. for 4 hours, then melted by an extruder set at 285° C., extruded from a multi-layer die into a two-layer laminated sheet form, and rapidly cooled and solidified on a casting drum (rotary cooling drum) set at a surface temperature of 30° C. utilizing the electrostatic pinning cooling technique to obtain a substantially amorphous sheet about 370 µm thick.

This amorphous sheet was stretched 3.0 times in the machine direction at 83° C., then a coating solution for forming the said easy-adhering resin layer was applied on the surface of the polyester (B) layer, and the coated sheet was further stretched 3.1 times in the transverse direction at 120° C. and then heat treated at 230° C. for 6 seconds to obtain an approximately 40 µm thick biaxially stretched white polyester film having the specified easy-adhering resin coating layer.

The final thickness of the polyester (B) layer laminated by using a multi-layer die was as shown in Table 3 below.

Then a coating solution for forming the said imaging layer was applied by a bar coater on the surface of the easy-adhering resin layer formed on the polyester (B) layer surface to make a imaging medium for ink jet printing. The properties of the thus obtained imaging medium were evaluated, the results being shown in Table 4.

Examples 2–4

The same procedure as defined in Example 1 was conducted except that the thickness of the polyester (B) layer was changed as shown in Table 3 to obtain the biaxially stretched white polyester films and the imaging media for ink jet printing, and their properties were evaluated. The results are shown in Table 4.

Examples 5–8

The same procedure as defined in Example 1 was conducted except that the polyester material W2 was used for forming the polyester (A) layer, and that the thickness of the polyester (B) layer was changed as shown in Table 3, to obtain the biaxially stretched white polyester films and the imaging media for ink jet printing, and their properties were evaluated. The results are shown in Table 4.

TABLE 3

| | Polyester material | | (B) layer thickness |
|---|---|---|---|
| | (A) layer | (B) layer | (µm) |
| Example 1 | W1 | T1 | 0.53 |
| Example 2 | W1 | T1 | 1.71 |
| Example 3 | W1 | T1 | 3.68 |
| Example 4 | W1 | T1 | 9.15 |
| Example 5 | W2 | T1 | 0.82 |
| Example 6 | W2 | T1 | 1.85 |
| Example 7 | W2 | T1 | 3.12 |
| Example 8 | W2 | T1 | 8.00 |

TABLE 4

| | Transmission density | (B) layer side | | |
|---|---|---|---|---|
| | | Hue b value | 60° glossiness | Adhesion |
| Example 1 | ⊚ | ⊚ | Δ | ○ |
| Example 2 | ⊚ | ⊚ | Δ | ○ |
| Example 3 | ⊚ | ⊚ | ○ | ⊚ |
| Example 4 | ⊚ | ⊚ | ⊚ | ○ |
| Example 5 | ⊚ | ⊚ | ○ | ○ |
| Example 6 | ⊚ | ⊚ | ⊚ | ○ |
| Example 7 | ⊚ | ⊚ | ⊚ | ○ |
| Example 8 | ⊚ | ⊚ | ⊚ | ○ |

<Easy-adhering resin layer>

The easy-adhering resin layers of Examples 9–16 and Comparative Examples 1–8 were obtained using the coating solutions prepared by blending the following resins (C–F) in the ratios shown in Table 5 below.

(C) A resin mainly comprising polyvinyl alcohol having a degree of saponification of about 94% and an average molecular weight of 500.

(D) A water-soluble or water-dispersible resin.

(D1) A polyester mainly comprising isophthalic acid, ethylene glycol and neopentyl glycol, with a carboxylate introduced as water-dispersing functional group.

(D2) A polyurethane comprising as main components a polyester diol mainly comprising terephthalic acid, isophthalic acid and ethylene glycol, isophorone diisocyanate and dimethylolpropionic acid, and dispersed with a carboxylate.

(E) Polyglycerol polyglycidyl ether having an average molecular weight of about 750.

(F) Inactive particles having an average size of 0.05 µm.

TABLE 5

| | C | D1 | D2 | E | F |
|---|---|---|---|---|---|
| Example 9 | 50 | 45 | | | 5 |
| Example 10 | 50 | | 45 | | 5 |
| Example 11 | 35 | 35 | | 25 | 5 |
| Example 12 | 35 | | 35 | 25 | 5 |
| Example 13 | 60 | | 35 | | 5 |
| Example 14 | 45 | 45 | | 5 | 5 |
| Example 15 | 30 | 60 | | 5 | 5 |
| Example 16 | 20 | 20 | | 55 | 5 |
| Comparative Example 1 | 95 | | | | 5 |
| Comparative Example 2 | | 95 | | | 5 |
| Comparative Example 3 | | | 95 | | 5 |
| Comparative Example 4 | | | | 95 | 5 |
| Comparative Example 5 | | 50 | | 45 | 5 |
| Comparative Example 6 | | | 50 | 45 | 5 |
| Comparative Example 7 | | 35 | 35 | 25 | 5 |
| Comparative Example 8 | 60 | | | 35 | 5 |

<Imaging layer>

A imaging layer for ink jet printing formed by applying a coating solution (an 8% water/isopropanol solution) comprising a polyvinylalcohol resin whose hydroxyl groups are partially modified to acetal (S-LEC KX-1: degree of acetalation (8±3 mol %) produced by Sekisui Chemical Co., Ltd.), the coating thickness being about 8 µm. The said polyvinyl acetal resin is polyvinyl alcohol having a degree of acetalation of about 8 mol %.

Example 9

100 parts of dimethyl terephthalate and 60 parts of ethylene glycol were supplied as starting materials into a reactor with 0.09 part of magnesium acetate as catalyst. The reaction was started at 150° C., and the temperature was gradually raised while causing evaporation of methanol until reaching 230° C. in 3 hours.

4 hours after start of the reaction, the ester exchange reaction was substantially completed. To this reaction mixture were added 0.04 part of ethyl acid phosphate and 0.04 part of antimony trioxide for 4.5-hour polycondensation reaction. The temperature was gradually raised from 230° C. till reaching 280° C., while the pressure was gradually reduced from normal pressure till finally reaching 0.3 mmHg. The reaction was stopped on the elapse of 4.5 hours from the start of the reaction, and the produced polymer was discharged out of the reactor under nitrogen pressure. The obtained polyester had an intrinsic viscosity of 0.65.

This polymer was subjected to solid phase polymerization under the conditions of 225° C. and 0.3 mmHg. The resultantly obtained polyester R1 had an intrinsic viscosity of 0.81. This polyester R1 was dried and blended with various types of additive in the ratios shown in Table 6 below using a vented twin-screw extruder to obtain the polyesters R2–R4.

TABLE 6

| Polyester type | Additive | Additive content | Particle size ($\mu$m) |
|---|---|---|---|
| R1 | None | | |
| R2 | Titanium dioxide | 40% | 0.3 |
| R3 | Amorphous silica | 3% | 3.5 |
| R4 | Fluorescent brightener (OB-1)* | 1% | |

*OB-1: trade name (produced by Eastman Kodak Co. Ltd)

The polyesters R1–R4 were uniformly blended in a ratio of R1:R2:R3:R4=50:30:16:4 to obtain a white polyester material.

This white polyester material was dried at 180° C. for 4 hours, melted by an extruder set at 285° C., extruded from a single-layer die into a sheet, and rapidly cooled and solidified on a casting drum (rotary cooling drum) set at a surface temperature of 30° C. using the electrostatic pinning cooling technique to obtain an approximately 370 $\mu$m thick, substantially amorphous sheet.

This amorphous sheet was stretched 3.0 times in the machine direction at 83° C., then a coating solution for forming the said easy-adhering resin layer was applied on the polyester surface, and the coated sheet was further stretched 3.1 times in the transverse direction at 120° C., and finally heat-treated at 230° C. for 6 seconds to obtain an approximately 40 $\mu$m thick biaxially stretched white polyester film having the specified easy-adhering resin coating layer.

Then a coating solution for forming the said imaging layer was applied on the surface of the easy-adhering resin layer by a bar coater to make a imaging medium for ink jet printing, and its properties were evaluated. The results are shown in Table 11.

Examples 10–16 and Comparative Examples 1–8

The same procedure as defined in Example 9 was conducted except that the solid content of the resin forming the easy-adhering resin layer in the coating solution was changed as shown in Table 6 to obtain the biaxially stretched white polyester films and the imaging media for ink jet printing, and their properties were evaluated. The results are shown in Table 7.

TABLE 7

| | Transmission density | Imaging face b value | Adhesion |
|---|---|---|---|
| Example 9 | ⊚ | ⊚ | Δ |
| Example 10 | ⊚ | ⊚ | Δ |
| Example 11 | ⊚ | ⊚ | ○ |
| Example 12 | ⊚ | ⊚ | ○ |
| Example 13 | ⊚ | ⊚ | Δ |
| Example 14 | ⊚ | ⊚ | ○ |
| Example 15 | ⊚ | ⊚ | ○ |
| Example 16 | ⊚ | ⊚ | Δ |
| Comparative Example 1 | ⊚ | ⊚ | X |
| Comparative Example 2 | ⊚ | ⊚ | X |
| Comparative Example 3 | ⊚ | ⊚ | X |
| Comparative Example 4 | ⊚ | ⊚ | X |
| Comparative Example 5 | ⊚ | ⊚ | X |
| Comparative Example 6 | ⊚ | ⊚ | X |
| Comparative Example 7 | ⊚ | ⊚ | X |
| Comparative Example 8 | ⊚ | ⊚ | X |

What is claimed is:

1. A white laminated polyester film comprising:
   a polyester base film having a transmission density of not less than 0.2 and a hue b value of the surface thereof of not more than 2; and
   a primer layer laminated on at least one side of the polyester base film, which primer layer is formed by applying a coating solution comprising a polyvinyl alcohol resin and a water-soluble resin, a water-dispersible resin or a mixture thereof.

2. A white laminated polyester film according to claim 1, wherein the water-soluble resin, water-dispersible resin or mixture thereof comprises a resin selected from the group consisting of at least one of polyester, polyurethane, or polyether.

3. A white laminated polyester film according to claim 1, wherein the coating solution contains inorganic particles.

4. A white laminated polyester film according to claim 1, wherein the coating solution contains polyglycerol glycidyl ethers.

5. A white laminated polyester film according to claim 1, wherein the content of polyvinyl alcohol resin is 20 to 80 weight % based on the solid content in the coating solution.

6. A white laminated polyester film according to claim 1, wherein the 60° glossiness of the surface of the primer layer is not less than 60%.

7. A white laminated polyester film according to claim 2, wherein a polyester base film comprises polyester (A) layer and polyester (B) layer, and the primer layer is formed on the surface of the polyester (B) layer.

8. A white laminated polyester film according to claim 7, wherein the thickness of polyester (B) layer is not less than 0.5 $\mu$m.

9. A imaging medium comprising as a substrate the white laminated polyester film as defined in claim 1.

10. A imaging medium according to claim 9, wherein a imaging layer comprising a polyvinyl alcohol resin is laminated on the primer layer.

* * * * *